US010215595B2

(12) United States Patent
York (10) Patent No.: US 10,215,595 B2
(45) Date of Patent: Feb. 26, 2019

(54) INDEXED OPTICAL ENCODER

(71) Applicant: Faro Technologies, Inc., Lake Mary, FL (US)

(72) Inventor: Frederick John York, Longwood, FL (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 181 days.

(21) Appl. No.: 15/133,646

(22) Filed: Apr. 20, 2016

(65) Prior Publication Data

US 2016/0313146 A1   Oct. 27, 2016

Related U.S. Application Data

(60) Provisional application No. 62/151,102, filed on Apr. 22, 2015.

(51) Int. Cl.
  *G01D 5/34* (2006.01)
  *G01D 5/347* (2006.01)
  *G01D 5/245* (2006.01)

(52) U.S. Cl.
  CPC ......... *G01D 5/3473* (2013.01); *G01D 5/2457* (2013.01); *G01D 5/34707* (2013.01)

(58) Field of Classification Search
  CPC .................................................. G01D 5/3473
  See application file for complete search history.

(56) References Cited

U.S. PATENT DOCUMENTS

| 3,187,187 A | 6/1965 | Wingate |
| 3,307,039 A | 2/1967 | Aemmer |
| 4,078,173 A | 3/1978 | Fultz |
| 4,162,399 A | 7/1979 | Hudson |
| 4,355,279 A | 10/1982 | Younge |
| 4,410,798 A | 10/1983 | Breslow |
| 4,524,347 A | 6/1985 | Rogers |
| 4,602,155 A | 7/1986 | Laplante |
| 4,678,908 A | 7/1987 | Laplante |
| 4,697,071 A | 9/1987 | Hiraoka et al. |

(Continued)

FOREIGN PATENT DOCUMENTS

| CN | 1171560 A | 1/1998 |
| EP | 0361867 A2 | 4/1990 |

(Continued)

OTHER PUBLICATIONS

International Search Report and Written Opinion for International Application No. PCT/US2016026870 dated Jun. 6, 2016; 13 pages.

*Primary Examiner* — Tony Ko
(74) *Attorney, Agent, or Firm* — Cantor Colburn LLP (57) ABSTRACT

An optical encoder for measuring rotation is provided. The optical encoder includes an optical disk having a diffraction grating track and an index track. The index track being disposed radially inward from the diffraction grating track. The diffraction grating track having a plurality of equally spaced lines that create an alternating light/dark pattern. The index track includes a pattern with at least two sequences, the at least two sequences being equally spaced about the diameter of the index track, each of the sequences having at least one mark and each of the sequences having a different number of marks from the other sequences.

20 Claims, 7 Drawing Sheets

(56) References Cited

U.S. PATENT DOCUMENTS

| | | |
|---|---|---|
| 4,712,000 A | 12/1987 | Yoshikawa et al. |
| 4,736,187 A | 4/1988 | Kibrick et al. |
| 4,794,251 A | 12/1988 | Scholian |
| 4,920,259 A | 4/1990 | Epstein |
| 4,945,231 A | 7/1990 | Ohya et al. |
| 5,003,170 A | 3/1991 | Masuda et al. |
| 5,038,243 A | 8/1991 | Gordon |
| 5,053,618 A | 10/1991 | McElroy |
| 5,355,220 A | 10/1994 | Kobayashi et al. |
| 5,486,923 A | 1/1996 | Mitchell et al. |
| 5,559,600 A | 9/1996 | Mitchell |
| 5,880,882 A | 3/1999 | Mitchell et al. |
| 5,909,283 A | 6/1999 | Eselun |
| 5,981,941 A | 11/1999 | Takata et al. |
| 6,683,543 B1 | 1/2004 | Yeo |
| 6,977,368 B2 | 12/2005 | Drescher et al. |
| 7,002,137 B2 | 2/2006 | Thorburn et al. |
| 7,012,677 B2 | 3/2006 | Mutschler |
| 7,141,780 B2 | 11/2006 | Homer et al. |
| 7,368,705 B2 | 5/2008 | Hare et al. |
| 8,068,040 B2 | 11/2011 | Wong et al. |
| 8,109,906 B2 | 2/2012 | Smisson, III et al. |
| 8,476,579 B2 | 7/2013 | York |
| 8,513,589 B2 | 8/2013 | York |
| 8,895,911 B2 | 11/2014 | Takahashi |
| 2002/0000514 A1 | 1/2002 | Haas et al. |
| 2003/0155489 A1 | 8/2003 | Yasuda et al. |
| 2006/0126474 A1 | 6/2006 | Hanks |
| 2006/0186360 A1 | 8/2006 | Remillard et al. |
| 2007/0018084 A1 | 1/2007 | Shimomura et al. |
| 2008/0156973 A1 | 7/2008 | Wong et al. |
| 2010/0057392 A1 | 3/2010 | York |
| 2012/0217384 A1* | 8/2012 | Nagura ............ G01D 5/34746 250/231.13 |
| 2015/0123588 A1* | 5/2015 | Yoshida .................. G05B 1/04 318/640 |

FOREIGN PATENT DOCUMENTS

| | | |
|---|---|---|
| GB | 2067282 A | 7/1981 |
| JP | 2005003559 A | 1/2005 |

\* cited by examiner

INDEXED OPTICAL ENCODER

CROSS-REFERENCE TO RELATED APPLICATIONS

The present application is a nonprovisional application of U.S. Provisional Application Ser. No. 62/151,102 filed on Apr. 22, 2015, the contents of which is incorporated by reference in its entirety.

BACKGROUND OF THE INVENTION

The subject matter disclosed herein relates to an optical encoder and an optical encoder with a plurality of index markings.

Optical encoders are devices that may be used for measuring angular displacement. Typically these devices detect shifts in fringe patterns of diffracted light. High accuracy is often a requirement for these devices. Many conventional devices have problems that limit their accuracy, reliability, calibration and ease of mass production. They are generally expensive when fine resolution is required.

In some applications it is desirable to not only measure the amount of rotation, but also the orientation or angular position of the encoder relative to a home or zero position. To determine the orientation, some optical encoders have used an index mark that may be detected by an optical sensor. The index mark in combination with the fringe pattern allows for the determination of both the amount of rotation and the orientation/position of the optical encoder. Since the orientation may not be initially known, the user may have to rotate the encoder to allow the detection and registration of the index mark. It should be appreciated that the registration of the index mark requires less than one rotation.

Accordingly, while existing optical encoders are suitable for their intended purposes the need for improvement remains, particularly in providing an optical encoder that improves and reduces the time for registering the orientation of the optical encoder.

BRIEF DESCRIPTION OF THE INVENTION

According to one aspect of the invention, an optical encoder is provided. The optical encoder includes an optical disk having a diffraction grating track and an index track, the index track being disposed radially inward from the diffraction grating track. The diffraction grating track has a plurality of equally spaced lines that create an alternating light/dark pattern. The index track has a pattern with at least two sequences, the at least two sequences being equally spaced about the diameter of the index track, each of the sequences having at least one mark and each of the sequences having a different number of marks from the other sequences.

According to another aspect of the invention, a method of determining rotational movement is provided. The method includes providing an encoder disk having a diffraction grating track and an index track. The diffraction grating track having a plurality of equally spaced lines that create an alternating light/dark pattern. The index track having a pattern with a plurality of sequences, the plurality of sequences having centroids that are equally spaced about the diameter of the index track. Each of the sequences having at least one mark and each of the sequences having a different number of marks from the other sequences. The method further includes the step of illuminating the optical disk with light. The light diffracted is detected by a sensor. A fringe signal is generated with the sensor. A first edge is detected of a first sequence of the plurality of sequences. A first length is determined of the first sequence. A first angular position of the optical disk is determined based at least in part on the first length. A second edge is detected of the second sequence of the plurality of sequences. A second length is determined of the second sequence. A second angular position of the optical disk is determined based at least in part on the second length.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Embodiments of the invention described herein provide advantages providing an optical encoder for measuring rotational motion. Embodiments provide advantages reducing the amount of travel before a reference location may be determined. Embodiments provide still further advantages in improving the reliability and robustness of the optical encoder by providing multiple registration locations that allows registration even if the encoder becomes dirty, scratches or a registration location becomes deformed.

Figure 1:
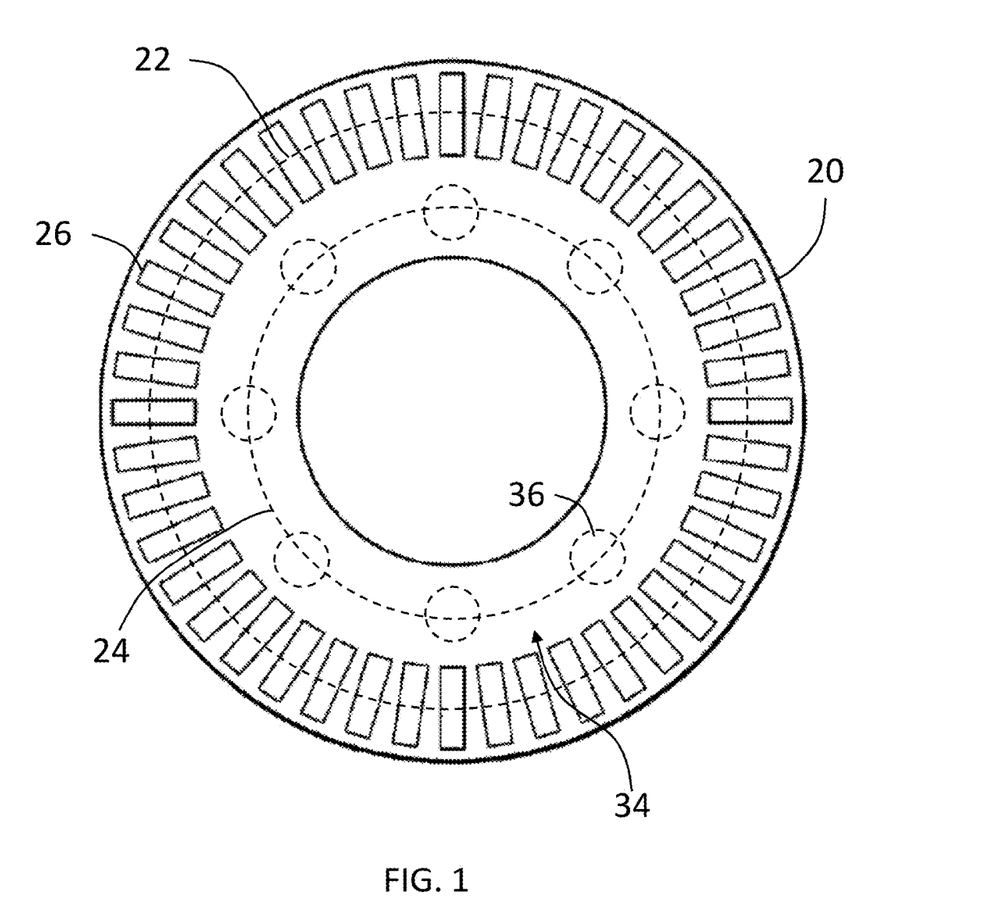
FIG. 1 is a top schematic view of an optical encoder disk in accordance with an embodiment of the invention.
Figure 2:
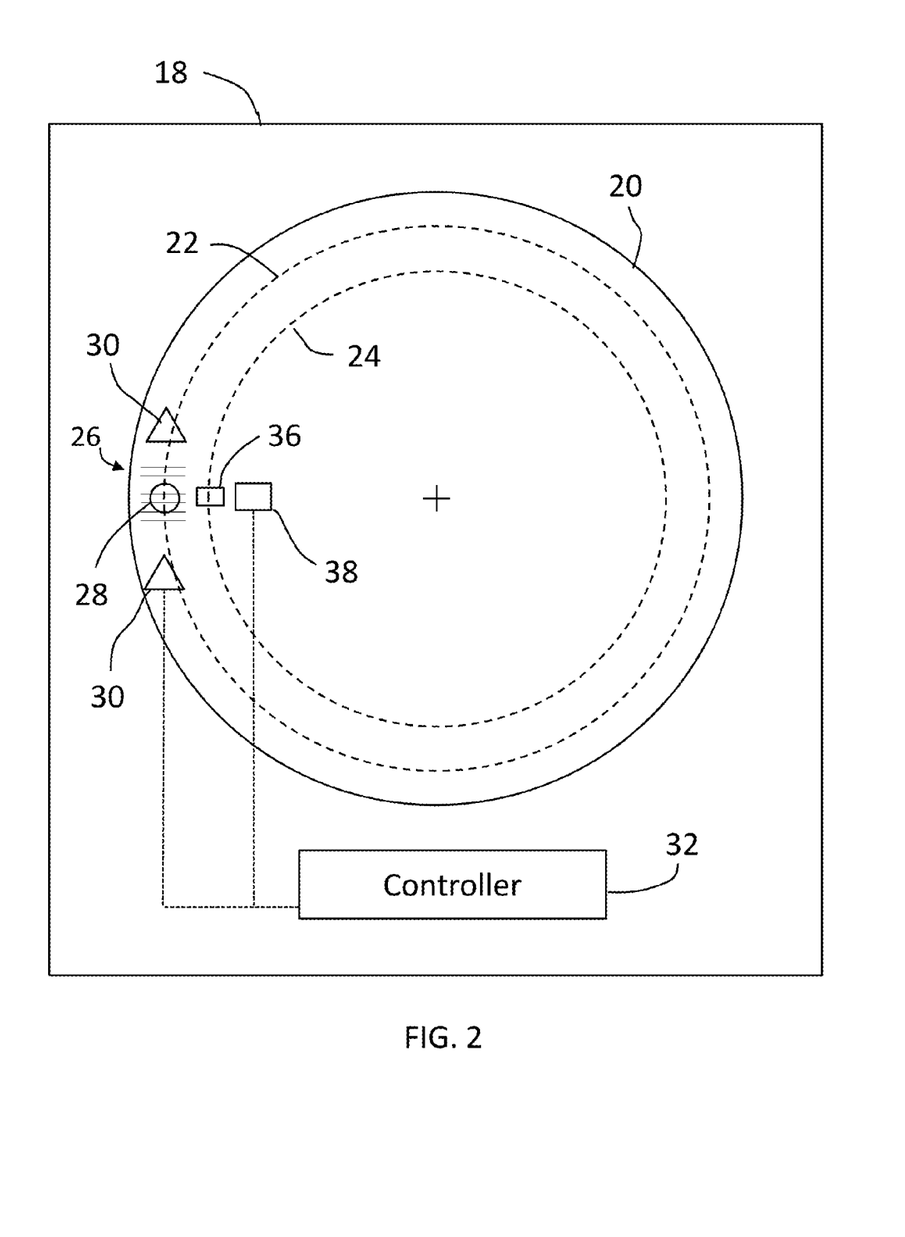
FIG. 2 is a top schematic view of an optical encoder in accordance with an embodiment of the invention.
Figure 8:
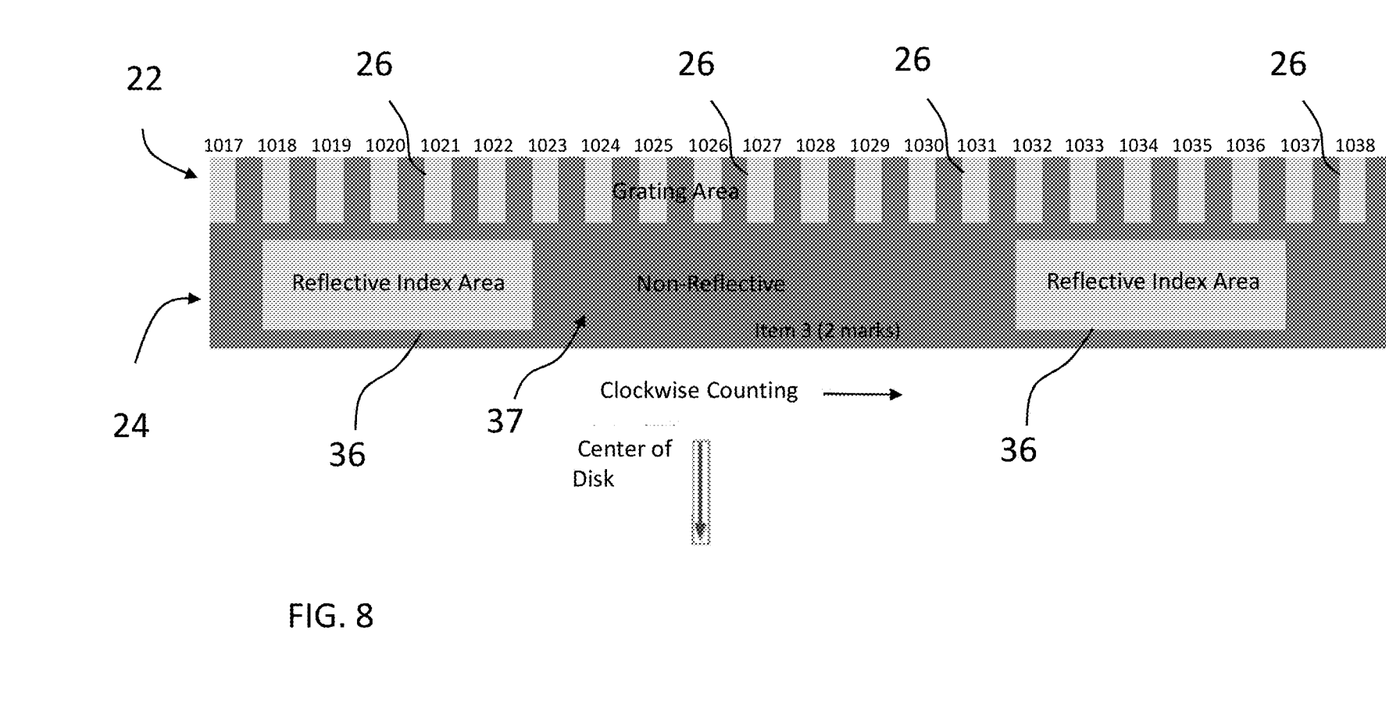
FIG. 8 is an illustration of the signal track and index track in accordance with an embodiment of the invention.

Referring now to FIG. 1, FIG. 2 and FIG. 8 an optical encoder 18 having an optical disk 20 is shown. The disk 20 includes a signal track 22 and an index track 24. The disk 20 can be formed from a circular piece of glass with a series of equally spaced lines 26 arranged on the signal track 22. The lines 26 define a diffraction grating that, when illuminated, create an alternating pattern of light/dark lines. The disk count refers to the number of light/dark pairs per disk revolution. As used herein, the pitch of the diffraction grating refers to the distance between each line of the signal track 22.

When the disk 20 is illuminated, such as by a light source 28 for example, the diffraction grating 26 generates a fringe pattern that is detected by a sensor 30, such as a photodetector for example. In one embodiment, the sensor detecting the fringe pattern is formed by a pair of sensors 30 arranged on either side of the light source 28 (when viewed from the position of FIG. 2). These offset sensors may be arranged at a ¼ pitch offset for example. The processing of the fringe pattern by the sensors 30 creates an output commonly referred to as a quadrature signal pair as is described in commonly owned U.S. Pat. No. 8,476,579, the contents of which is incorporated by reference herein. It should be appreciated that the quadrature signal pair allows the direction and magnitude of rotation to be determined by a counter. In one embodiment, the counter is a module within a controller 32 that is electrically coupled to the sensors 30 and light source 28.

In one embodiment, the index track 24 is arranged radially inward from the signal track 22. The index track 24 includes a pattern 34 (FIGS. 3, 5 and FIG. 6) having two or more sequences 36. As will be discussed in more detail herein, in one embodiment each of the sequences are formed from a plurality of marks. Each of the sequences is unique relative to the other sequences in the pattern 34. This allows the sequences 36 to be used as an index mark. Since each of the sequences 36 is identifiable relative to the other sequences 36 the orientation or angular position may be registered more quickly with less rotational movement. One of the sequences 36 may be designated as the "zero" reference position. As used herein, the term "pattern" refers to the configuration or order of the sequences 36. The term "sequence" refers to a collection of marks.

It should be appreciated that the diffraction grating and sequences may be formed using known techniques, such as but not limited to using layers of chrome to form a reflective surface and the marks by blackening or darkening the glass for example. In one embodiment, the nonreflective portions 37 (FIG. 8) may be formed by flat black paint. It will be understood that as used herein, the term non-reflective does not require a surface to have 0% reflectivity. For example, in some embodiments, a surface may have low reflectivity, such as a reflectivity of 5% or less for example.

The light from light source 28 reflects off of the index track 24 and is received by an optical detector 38. The optical detector 38 may be any suitable optical detector that outputs a signal, such as a voltage for example, in response to the marks within the sequence 36 moving through the field of view of the optical detector 38. The optical detector 38 has an associated detector area, which captures the light reflected from an index mark (40) located on the surface of the disk 20.

The output signal from the optical detector 38 is transmitted to the controller 32. The controller 32 may be a suitable electronic device capable of accepting data and instructions, executing the instructions to process the data, and presenting the results. The controller 32 may be or may include a microprocessor and memory (e.g. RAM or ROM) for example. The controller 32 may also be an ASIC (application specific integrated circuit) or an analog circuit for example. The controller 32 may be co-located adjacent the disk 20, may be remotely located or the functionality described herein may be incorporated into a controller for the equipment the optical encoder 18 is measuring, such as an articulated arm coordinate measurement machine (AACMM) or a laser tracker for example.

Controller 32 is capable of converting the analog voltage or current level provided by optical detector into a digital signal indicative of the amount of light reflected from the index track 24. Alternatively, optical detector may be configured to provide a digital signal to controller 32, or an analog-to-digital (A/D) converter (not shown) maybe coupled between optical detector 38 and controller 32 to convert the analog signal provided by optical detector 38 into a digital signal for processing by controller 32. Controller 32 uses the digital signals act as input to various processes for determining the amount of rotation and resolve the rotational orientation of the disk 20.

It should be appreciated that the controller 32 may include communications circuits (not shown) that allow the controller 32 to transmit signals via data transmission media (not shown) to other remote controllers or computers. In one embodiment, signals from the controller 32 are transmitted to a controller of an AACMM and are used for determining the rotation of an arm segment and in the determination of three-dimensional coordinates of points on an object.

Figure 3:
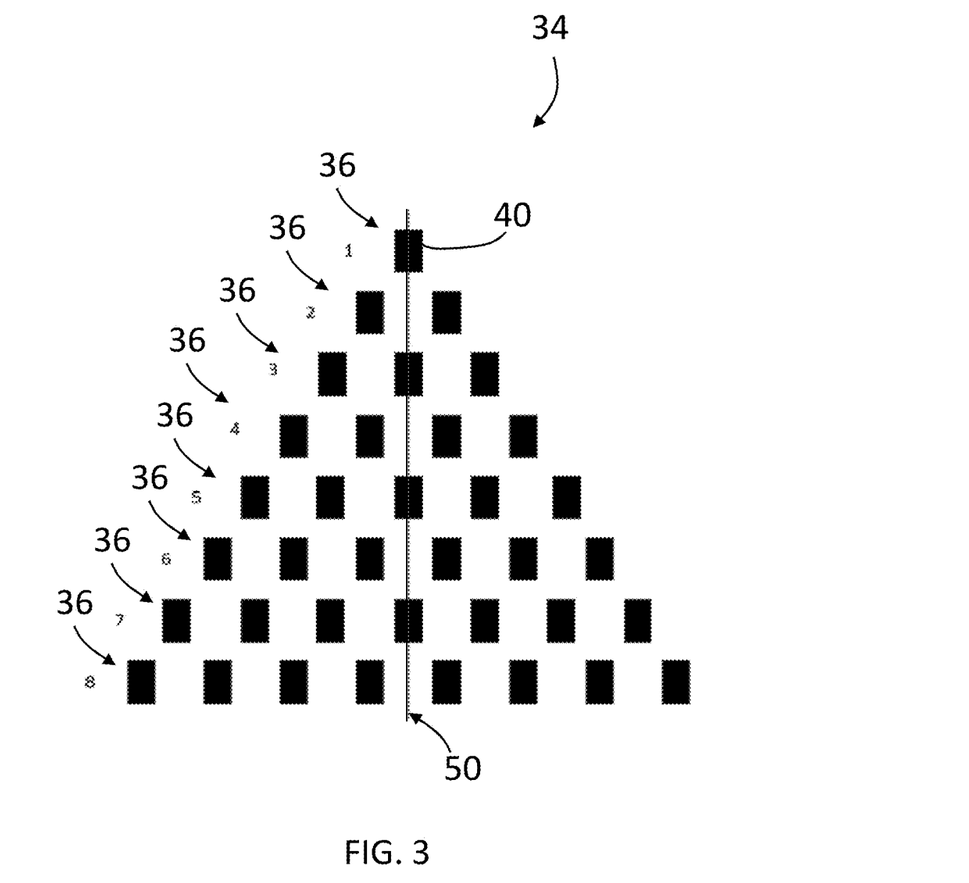
FIG. 3 is an illustration of a pattern of index sequences that may be used in the optical encoder of FIG. 1.

As discussed above, each of the sequences 36 is different (e.g. unique) relative to the other sequences 36 in pattern 34 on the index track 22. In one embodiment, each sequence 36 is formed from a plurality of marks 40. The sequences 36 shown in FIG. 3 illustrate a pattern with eight sequences. The number of marks 40 then determines the overall length of the sequence 36. The length of the sequence 36 may be measured in the number of fringes detected in the signal track between the start and the end of the sequence 36. In the case of a pattern having 8 sequences, the first sequence would have 1 mark, the second sequence 2 marks and so on until the eighth sequence has eight marks. In one embodiment, the sequence is centered on the sequence center 50 of the sequence. In other words, for an eight sequence pattern the sequence center 50 of each sequence is arranged 45 degrees apart.

Figure 4:
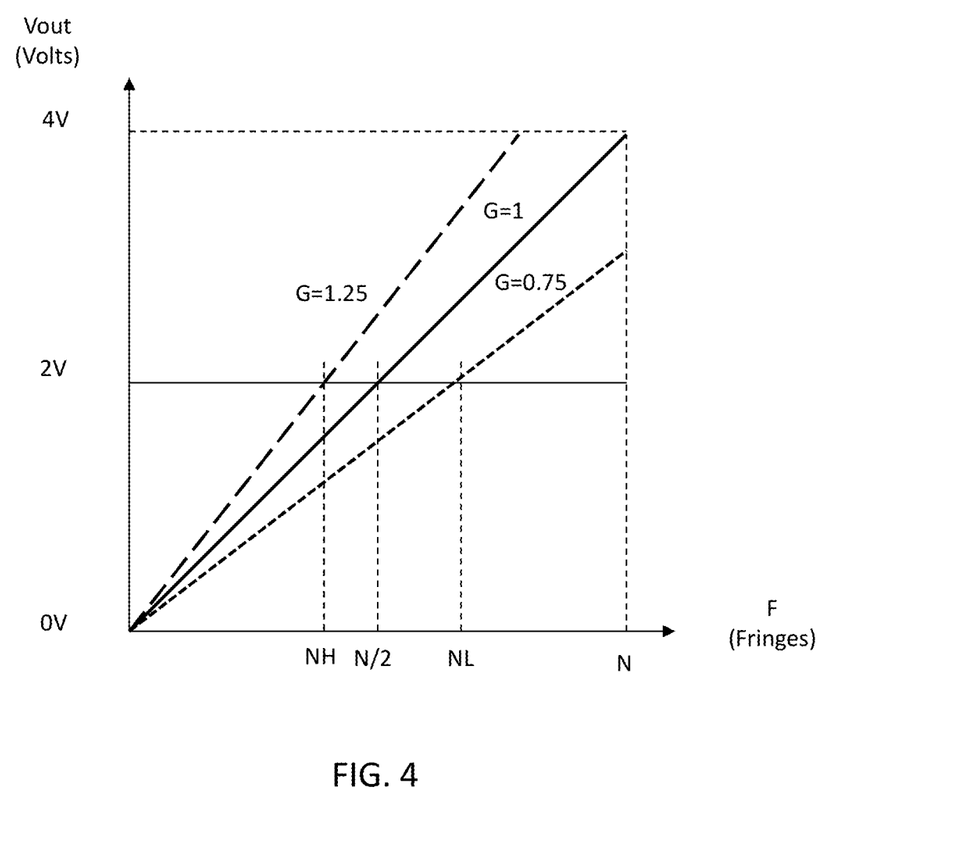
FIG. 4 is a graphical plot of the optical detector output as a function of optical gain.

It has been found that decreasing the width of each mark 40 may be advantageous in reducing the variation in the measured length and the length of the sequences may in some embodiments be made shorter. Further, by increasing the optical gain and reducing the width of the individual mark, a sharper delineation of the leading edge and trailing edge of the sequence may be detected. FIG. 4 illustrates a graphical plot of the optical detector output leading edge as a function of optical gain. The shift in the index trip point (e.g. 2V) may be evaluated using the following equations:

$$V\text{out} = G^*(4/N)^*V/\text{fringe}^*F \quad \text{(Equation 1)}$$

$$V\text{out}_H = G_H^*(4/N)^*V/\text{fringe}^*F \quad \text{(Equation 2)}$$

$$V\text{out}_L = G_L^*(4/N)^*V/\text{fringe}^*F \quad \text{(Equation 3)}$$

Where G is the optical gain, F is the fringes, N is the detector length of the optical detector 38, and V is the voltage. By setting $V\text{out} = V\text{out}_H = V\text{out}_L = 2$ volts, Equations 1-3 may be solved.

$$F_1 = N/2 \quad \text{(Equation 4)}$$

$$F_2 = N/2.5 \quad \text{(Equation 5)}$$

$$F_3 = 2N/3 \quad \text{(Equation 6)}$$

Therefore:

$$\Delta_{12} = F_1 - F_2 = N/10 \quad \text{(Equation 7)}$$

$$\Delta_{13} = F_1 - F_3 = -N/6 \quad \text{(Equation 8)}$$

For a mark width that is equal to the detector length of N=31.5 fringes, then $\Delta_{12} = 3.12$ fringes and $\Delta_{13} = 0.833$ fringes. Therefore the total shrink/expansion of the index pulse about its nominal value is equal to $2^*\Delta_{xy}$.

Therefore, in the illustrated embodiments, the sequences 36 are formed from a plurality of marks 40 having a relatively small width rather than a smaller number of marks 40 with a larger width. In one embodiment, the mark 40 is trapezoidal in shape such that it expands (e.g. increases in width) from an end along an inner radius to an opposing end along the outer radius. In one embodiment, the mark width is 83.60 um at the inner radius and 94.65 um at the outer radius and has a radial length of 1.44 mm. The sides of each mark 40 are arranged collinear with the grating lines of the signal track 22.

It should be appreciated that it is desirable to place as many sequences on the index track 24 as possible while maintaining sufficient distance between the sequences for reliably identifying the sequence. The more sequences that are in the pattern, the smaller the rotational distance that may be traveled before a sequence is detected and identified and the orientation determined. The width or length of the sequence is determined by the width of the mark 40 and the distance between adjacent marks 40 in the sequence. In one embodiment, the distance between adjacent marks is less than or equal to the detector length of the optical detector 38 (as a function of optical gain).

Figure 5:
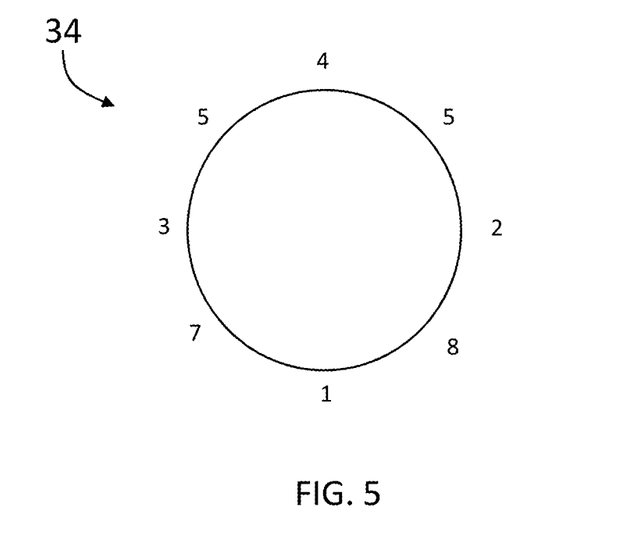
FIG. 5 is a schematic illustration of a pattern of sequences on an optical encoder.
Figure 6:
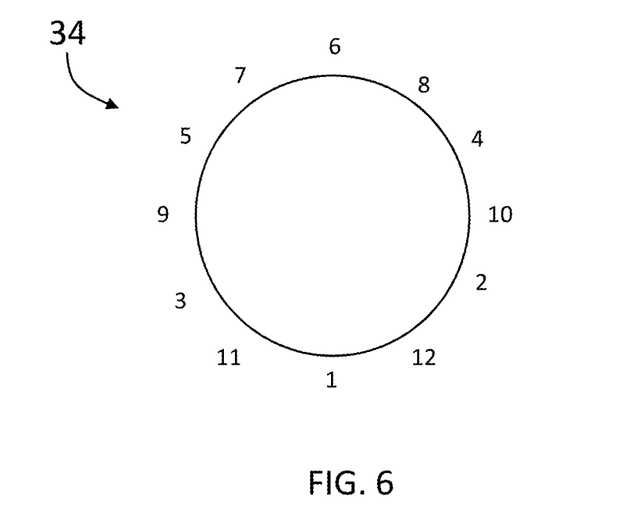
FIG. 6 is another schematic illustration of a pattern of sequences on an optical encoder.

Referring now to FIG. 5 and FIG. 6, two different patterns are shown with the order of the sequences are arranged to maximize the distance while reducing the variation between adjacent sequences. As used herein, the distance between sequences refers to the angular distance from the trailing edge of one sequence to the leading edge of the adjacent sequence. FIG. 5 illustrates an eight sequence pattern (45 degrees apart), such as that disclosed in FIG. 3. In this pattern, the sequences are ordered (in a clockwise direction): first sequence; seventh sequence; third sequence; fifth sequence; fourth sequence; sixth sequence; second sequence; and eighth sequence. Similarly, FIG. 6 illustrates a 12 sequence pattern (30 degrees apart) where the sequences are ordered (in a clockwise direction): first sequence; eleventh sequence; third sequence; ninth sequence; fifth sequence; seventh sequence; sixth sequence; eighth sequence; fourth sequence; tenth sequence; second sequence; twelfth sequence.

Figure 7:
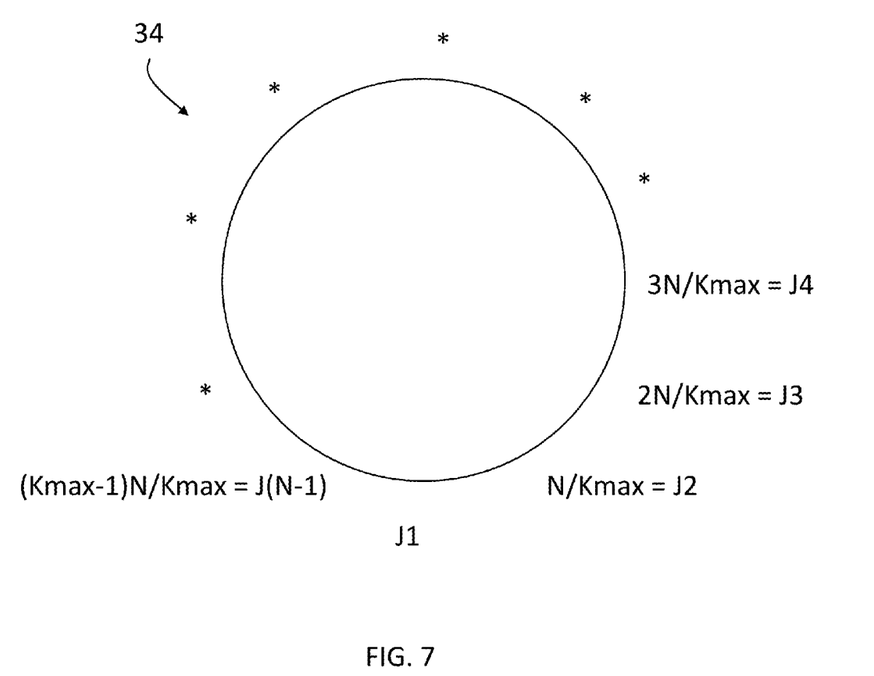
FIG. 7 is a schematic illustration of a generalized pattern of sequences on an optical encoder.

In the illustrated embodiment shown in FIG. 5, the sequences are counted in a counterclockwise direction starting at position 1 (J1) with a sequence length equal to one; k(1)=1. The next sequence J2 has a length of eight; k(2)=8. The third sequence J3 has a length of two; k(3)=2, and so forth. Referring now to FIG. 7, a method of determining the number of sequences that may be used will be described where $J_N$ is the sequence number. To allow an arbitrary sequence let $k(j)=k_j$. Then:

$$\Delta k(j)=Z+(k_j-1)*D \qquad \text{(Equation 9)}$$

Where D is the distance between the marks in a sequence and Z is the number of grating lines corresponding to the width of the sequence. This provides the total number of lines in sequence $K_j$ from 1 to $J_{max}$. The angular offset between the sequence centers of the sequences depends on whether there is an even or odd number of marks in the sequences For even numbers of marks:

$$\text{Offset}(k_j)=(\Delta k_j/2)-0.5*\text{line} \qquad \text{(Equation 10)}$$

For odd numbers of marks $$\text{Offset}(kj)=(\Delta k_j/2)+0.5*\text{line} \qquad \text{(Equation 11)}$$

Therefore, the midpoint and the start and end points (in fringes) may be determined as follows:

$$\text{Mid}(j)=(j-1)*(N/J_{max})+\text{Mid}(1) \qquad \text{(Equation 12)}$$

$$\text{Start}(k_j)=\text{Mid}(j)-\text{Offset}(k_j) \qquad \text{(Equation 13)}$$

$$\text{End}(K_j)=\text{Start}(k_j)+2*\text{Offset}(k_j) \qquad \text{(Equation 14)}$$

In one embodiment, it is assumed that the spacing between the fringes (based on the detector length) is 14 fringes. With this spacing between the marks 40, the maximum number of sequences is 21 (17.14 degrees apart). If there are 4096 fringes in the signal track, this provides an offset=4096/21=195 fringes. With a 33 fringe guard band the total length of sequence #21 is 319 fringes (+/−159.2 fringes from its midpoint). As used herein, the term "guard band" refers to a distance (in fringes) between the trailing edge of one sequence and the leading edge of the next sequence. It is desired to provide a guard band with a width sufficient to distinguish the sequences as being distinct. In one embodiment, the guard band has a width of 33 fringes. The largest adjacent sequence to sequence #21 is sequence #2, which has a width of 53 fringes (including the guard band), or +/−26.5 fringes about the midpoint. Therefore 159.5+26.5=186 fringes. Since this is less than the offset of 195 fringes discussed above, the twenty-one sequences will fit on the optical encoder. The sequence order for a 21 sequence pattern would be (in a clockwise direction) the following order to maximize distance while reducing variability: 1, 20, 3, 18, 5, 16, 7, 14, 9, 12, 11, 10, 13, 8, 15, 6, 17, 4, 19, 2, 21.

It should be appreciated that while embodiments herein illustrate and refer to the sequences as having equally spaced marks, the claimed invention should not be so limited. In other embodiments, the marks may have variable spacing. Further, while embodiments herein refer to a single index track, the claimed invention should not be so limited. In other embodiments, the optical encoder may include two or more index tracks, such as an index track arranged on either side of the signal track.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An optical encoder comprising:
an optical disk having a diffraction grating track and an index track, the index track being disposed radially inward from the diffraction grating track;
the diffraction grating track having a plurality of equally spaced lines that create an alternating light/dark pattern;
the index track having a pattern with at least two sequences of marks, the at least two sequences being equally spaced about a circumference of the index track, each of the at least two sequences having at least one mark and each of the at least two sequences having a different number of marks from each of the other sequences;
wherein the number of marks of a given sequence define the length of the sequence, the length of the sequence being measured in a number of fringes detected in the index track between the start and the end of the sequence as generated by the marks of the sequence, wherein each sequence includes a sequence center at the midpoint between the start and end of the given sequence, wherein each sequence center is angularly spaced apart from each other sequence center about the optical disk and defines a specific angular position about the optical disk, and wherein each sequence is separated from another sequence by a rotational distance.

2. The optical encoder of claim 1 wherein the pattern has 8 sequences, the sequence center of each sequence being arranged 45 degrees apart from adjacent sequences.

3. The optical encoder of claim 2 wherein the 8 sequences includes:
   a first sequence having 1 mark;
   a second sequence having 2 marks;
   a third sequence having 3 marks;
   a fourth sequence having 4 marks;
   a fifth sequence having 5 marks;
   a sixth sequence having 6 marks;
   a seventh sequence having 7 marks; and
   an eighth sequence having 8 marks.

4. The optical encoder of claim 3 wherein the pattern is arranged with the plurality of sequences arranged in a following order in a clockwise direction: first sequence; seventh sequence; third sequence; fifth sequence; fourth sequence; sixth sequence; second sequence; and eighth sequence.

5. The optical encoder of claim 1 wherein the pattern has 12 sequences, the sequence center of each sequence being arranged 30 degrees apart from adjacent sequences.

6. The optical encoder of claim 1 wherein the sequences are arranged to maximize the rotational distance between edges of adjacent sequences.

7. The optical encoder of claim 1 further comprising:
   a light source arranged adjacent the diffraction grating track;
   a sensor arranged to detect fringes from the diffraction grating track; and
   a photodetector arranged to receive light from the light source reflected off of the index track, the optical encoder having a detector length.

8. The optical encoder of claim 7 wherein a length of a sequence is equal to a mark width+(a number of marks in the sequence−1)*a distance between the sequence centers of adjacent marks.

9. The optical encoder of claim 8 wherein the distance between the sequence centers of adjacent marks is equal to Total number of fringes/Number of index sequences.

10. The optical encoder of claim 8 wherein each mark has a trapezoidal shape with sides extending radially from a center of the optical disk.

11. The optical encoder of claim 10 wherein an end of the mark closest to the center of the optical disk has a width of 83.60 um and an opposing end has a width of 94.65 um.

12. A method of determining rotational movement, the method comprising:
   providing an encoder disk having a diffraction grating track and an index track, the diffraction grating track having a plurality of equally spaced lines that create an alternating light/dark pattern, the index track having a pattern with a plurality of sequences, the plurality of sequences of marks having sequence centers that are equally spaced about a circumference of the index track, each of the plurality of sequences having at least one mark and each of the plurality sequences having a different number of marks from each of the other sequences, wherein the number of marks of a given sequence define the length of the sequence, the length of the sequence being measured in a number of fringes detected in the index track between the scan and the end of the sequence as generated by the marks of the sequence, wherein each sequence center is angularly spaced apart from each other sequence center about the optical disk and defines a specific angular position about the optical disk, and wherein each sequence is separated from another sequence by a rotational distance;
   illuminating the encoder disk with light;
   detecting the light diffracted with a sensor;
   generating a fringe signal with the sensor;
   detecting a first edge of a first sequence of the plurality of sequences;
   determining a first length of the first sequence;
   determining a first angular position of the encoder disk based at least in part on the first length;
   detecting a second edge of the second sequence of the plurality of sequences;
   determining a second length of the second sequence; and
   determining a second angular position of the encoder disk based at least in part on the second length.

13. The method of claim 12 wherein the step of generating the fringe signal includes generating a plurality of fringe signals in response to rotation of the encoder disk.

14. The method of claim 13 wherein the determination of the first length is based at least in part on the detection of the first edge and the number of the plurality of fringe signals generated while the first sequence reflects the light onto a photodetector.

15. The method of claim 14 wherein the first sequence includes at least one reflective mark and the second sequence includes at least two reflective marks, the first sequence and second sequence having a different number of reflective marks.

16. The method of claim 15 wherein the at least two reflective marks of the second sequence are spaced apart by a distance equal to or less than an detector length of the photodetector.

17. The method of claim 16 wherein the length of the second sequence is equal to a mark width of the at least two reflective marks+(a number of reflective marks in the sequence−1)*the distance between the centers of adjacent marks of the at least two reflective marks.

18. The method of claim 17 wherein the plurality of sequences includes 8 sequences, the 8 sequences includes a first sequence with 1 mark, a second sequence with 2 marks, a third sequence with 3 marks, a fourth sequence with 4 marks, a fifth sequence with 5 marks, a six sequence with six marks, a seventh sequence with seven marks and an eighth sequence with eight marks.

19. The method of claim 18 wherein the pattern is arranged with the plurality of sequences arranged in a following order in a clockwise direction: first sequence; seventh sequence; third sequence; fifth sequence; fourth sequence; sixth sequence; second sequence; and eighth sequence.

20. The method of claim 16 further comprising selecting an order of sequences about the index track to maximize an angular distance between adjacent sequences.

* * * * *